US012705697B2

(12) United States Patent
C et al.

(10) Patent No.: US 12,705,697 B2
(45) Date of Patent: Aug. 11, 2026

(54) SYSTEM AND METHOD FOR IMPROVING IMAGE QUALITY OF SUSCEPTIBILITY WEIGHTED IMAGING UTILIZING DEEP LEARNING

(71) Applicant: GE Precision Healthcare LLC, Wauwatosa, WI (US)

(72) Inventors: Florintina C, Bengaluru (IN); Sajith Rajamani, Bengaluru (IN); Preetham Shankpal, Bengaluru (IN); Suresh Emmanuel Devadoss Joel, Bengaluru (IN); Sudhanya Chatterjee, Bengaluru (IN); Rohan Patil, Bengaluru (IN); Ramesh Venkatesan, Bengaluru (IN); Rajagopalan Sundaresan, Bengaluru (IN); Harsh Kumar Agarwal, Jaipur (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 475 days.

(21) Appl. No.: 18/144,452

(22) Filed: May 8, 2023

(65) Prior Publication Data

US 2024/0378696 A1 Nov. 14, 2024

(51) Int. Cl.

*G06T 5/50* (2006.01)
*G06T 5/70* (2024.01)
*G06T 5/73* (2024.01)

(52) U.S. Cl.

CPC .................. *G06T 5/50* (2013.01); *G06T 5/70* (2024.01); *G06T 5/73* (2024.01);
(Continued)

(58) Field of Classification Search

None
See application file for complete search history.

(56) References Cited

U.S. PATENT DOCUMENTS 11,346,912 B2 * 5/2022 Guidon .............. G01R 33/4828
11,360,179 B2 * 6/2022 Dagher ............ G01R 33/56391
(Continued)

FOREIGN PATENT DOCUMENTS

CN 107209243 A * 9/2017 ............... A61B 5/02
WO WO-2021257742 A1 * 12/2021 ....... G01R 33/56366
WO WO-2023186609 A1 * 10/2023 ............. G16H 30/40

OTHER PUBLICATIONS

Borrelli P, Palma G, Tedeschi E, Cocozza, Comerci M, Alfano B, et al. Improving Signal-to-Noise Ratio in Susceptibility Weighted Imaging: A Novel Multicomponent Non-Local, . PLoS One 10(6): e0126835. doi:10.1371/journal.pone.0126835 (Year: 2015).*
(Continued)

*Primary Examiner* — Jiangeng Sun
(74) *Attorney, Agent, or Firm* — Fletcher Yoder, P.C.

(57) ABSTRACT

A method includes acquiring an MRI complex signal having a plurality of complex echoes during an SWI sequence. The method includes phase filtering each complex echo of the plurality of complex echoes. The method also includes generating a respective phase image and a respective magnitude image from each phase filtered complex echo. The method further includes combining separately the respective magnitude images of the plurality of complex echoes with each other to generate a combined magnitude image and the respective phase images of the plurality of complex echoes with each other to generate a combined phase image. The method includes generating a complex image from both the combined magnitude image and the combined phase image. The method includes utilizing a deep learning-based denoising network to denoise the complex image to generate a denoised complex image.

20 Claims, 13 Drawing Sheets

(52) U.S. Cl.
CPC ............... *G06T 2207/10088* (2013.01); *G06T 2207/20081* (2013.01); *G06T 2207/20084* (2013.01); *G06T 2207/20216* (2013.01)

(56) References Cited

U.S. PATENT DOCUMENTS

| | | | | |
|---|---|---|---|---|
| 2002/0196019 | A1* | 12/2002 | Yamazaki .......... | G01R 33/5613 324/309 |
| 2007/0286808 | A1* | 12/2007 | Bengi .................... | A61B 5/415 600/410 |
| 2009/0102481 | A1* | 4/2009 | Haacke ................ | G01R 33/565 324/318 |
| 2012/0049846 | A1* | 3/2012 | Gross ................... | G01R 33/565 324/309 |
| 2015/0310650 | A1* | 10/2015 | Lu ............................ | G06T 5/92 324/322 |
| 2022/0026516 | A1* | 1/2022 | Guidon ................ | G01R 33/565 |
| 2022/0188602 | A1* | 6/2022 | Meyer .................... | G06N 3/045 |
| 2022/0260660 | A1* | 8/2022 | Ennis ............... | G01R 33/56316 |
| 2023/0342886 | A1* | 10/2023 | Meyer ....................... | G06T 5/70 |

OTHER PUBLICATIONS

Borrelli et al., "Improving Signal-to-Noise Ratio in Susceptibility Weighted Imaging: A Novel Multicomponent Non-Local Approach," Plos One | DOI:10.1371/journal.pone.0126835, Jun. 1, 2015, 16 pgs.
Borrelli et al., "Improving SNR in Susceptibility Weighted Imaging by a NLM-based Denoising Scheme," IEEE, 2014, 5 pgs.

* cited by examiner

206

SYSTEM AND METHOD FOR IMPROVING IMAGE QUALITY OF SUSCEPTIBILITY WEIGHTED IMAGING UTILIZING DEEP LEARNING

BACKGROUND

The subject matter disclosed herein relates to medical imaging and, more particularly, to a system and a method for improving image quality of susceptibility weighted imaging (SWI) utilizing deep learning.

Non-invasive imaging technologies allow images of the internal structures or features of a patient/object to be obtained without performing an invasive procedure on the patient/object. In particular, such non-invasive imaging technologies rely on various physical principles (such as the differential transmission of X-rays through a target volume, the reflection of acoustic waves within the volume, the paramagnetic properties of different tissues and materials within the volume, the breakdown of targeted radionuclides within the body, and so forth) to acquire data and to construct images or otherwise represent the observed internal features of the patient/object.

During magnetic resonance imaging (MRI), when a substance such as human tissue is subjected to a uniform magnetic field (polarizing field $B_0$), the individual magnetic moments of the spins in the tissue attempt to align with this polarizing field, but precess about it in random order at their characteristic Larmor frequency. If the substance, or tissue, is subjected to a magnetic field (excitation field $B_1$) which is in the x-y plane and which is near the Larmor frequency, the net aligned moment, or "longitudinal magnetization", $M_z$, may be rotated, or "tipped", into the x-y plane to produce a net transverse magnetic moment, $M_t$. A signal is emitted by the excited spins after the excitation signal $B_1$ is terminated and this signal may be received and processed to form an image.

When utilizing these signals to produce images, magnetic field gradients ($G_x$, $G_y$, and $G_z$) are employed. Typically, the region to be imaged is scanned by a sequence of measurement cycles in which these gradient fields vary according to the particular localization method being used. The resulting set of received nuclear magnetic resonance (NMR) signals are digitized and processed to reconstruct the image using one of many well-known reconstruction techniques.

SWI is a high resolution MRI sequence that is particularly sensitive to compounds which distort the local magnetic field and as such make it useful in detecting blood products, iron, and diamagnetic calcium. In addition, SWI is used as part of brain MR imaging. The phase images are high pass filtered to remove the slow varying susceptibility changes. This is important to differentiate between paramagnetic and diamagnetic substances. When this filtered phase image is used to accentuate the directly observed signal loss in the magnitude image, it is generally raised to a higher power and the noise gets magnified. This imparts undesirable effects in the SWI image.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a computer-implemented method for improving image quality of susceptibility weighted imaging (SWI) is provided. The computer-implemented method includes acquiring, via a processor, a magnetic resonance imaging (MRI) complex signal having a plurality of complex echoes of a region of interest via an MRI scanner from a coil during an SWI sequence. The computer-implemented method further includes phase filtering, via the processor, each complex echo of the plurality of complex echoes. The computer-implemented method still further includes generating, via the processor, a respective phase image and a respective magnitude image from each phase filtered complex echo. The computer-implemented method even further includes combining, via the processor, separately the respective magnitude images of the plurality of complex echoes with each other to generate a combined magnitude image and the respective phase images of the plurality of complex echoes with each other to generate a combined phase image. The computer-implemented method yet further includes generating, via the processor, a complex image from both the combined magnitude image and the combined phase image. The computer-implemented method still further includes utilizing, via the processor, a deep learning-based denoising network to denoise the complex image to generate a denoised complex image.

In another embodiment, a system for improving image quality of susceptibility weighted imaging (SWI) is provided. The system includes a memory encoding processor-executable routines. The system also includes a processor configured to access the memory and to execute the processor-executable routines, wherein the routines, when executed by the processor, cause the processor to perform actions. The actions include acquiring a magnetic resonance imaging (MRI) complex signal having a plurality of echoes of a region of interest via an MRI scanner from a coil during an SWI sequence. The actions further include phase filtering each complex echo of the plurality of echoes. The actions yet further include generating a respective phase image and a respective magnitude image from each phase filtered complex echo. The actions still even further include combining separately the respective magnitude images of the plurality of complex echoes with each other to generate a combined magnitude image and the respective phase images of the plurality of complex echoes with each other to generate a combined phase image. The actions still further include generating a complex image from both the combined magnitude image and the combined phase image. The actions yet further include utilizing a deep learning-based denoising network to denoise the complex image to generate a denoised complex image.

In a further embodiment, a non-transitory computer-readable medium, the computer-readable medium including processor-executable code that when executed by a processor, causes the processor to perform actions. The actions include acquiring a magnetic resonance imaging (MRI) complex signal having a plurality of echoes of a region of interest via an MRI scanner from a coil (e.g., radio frequency receiving coil) during a multi-echo acquisition imaging sequence. The actions further include phase filtering each complex echo of the plurality of echoes. The actions yet further include generating a respective phase image and a respective magnitude image from each phase filtered complex echo. The actions still even further include combining separately the respective magnitude images of the plurality of complex echoes with each other to generate a combined magnitude image and the respective phase images of the plurality of complex echoes with each other to generate a combined phase image. The actions still further include generating a complex image from both the combined magnitude image and the combined phase image. The actions yet further include utilizing a deep learning-based denoising network to denoise the complex image to generate a denoised complex image. The actions further include applying super-resolution to the denoised complex image to generate a higher resolution fully denoised complex image free of any blur.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

Figure 1:
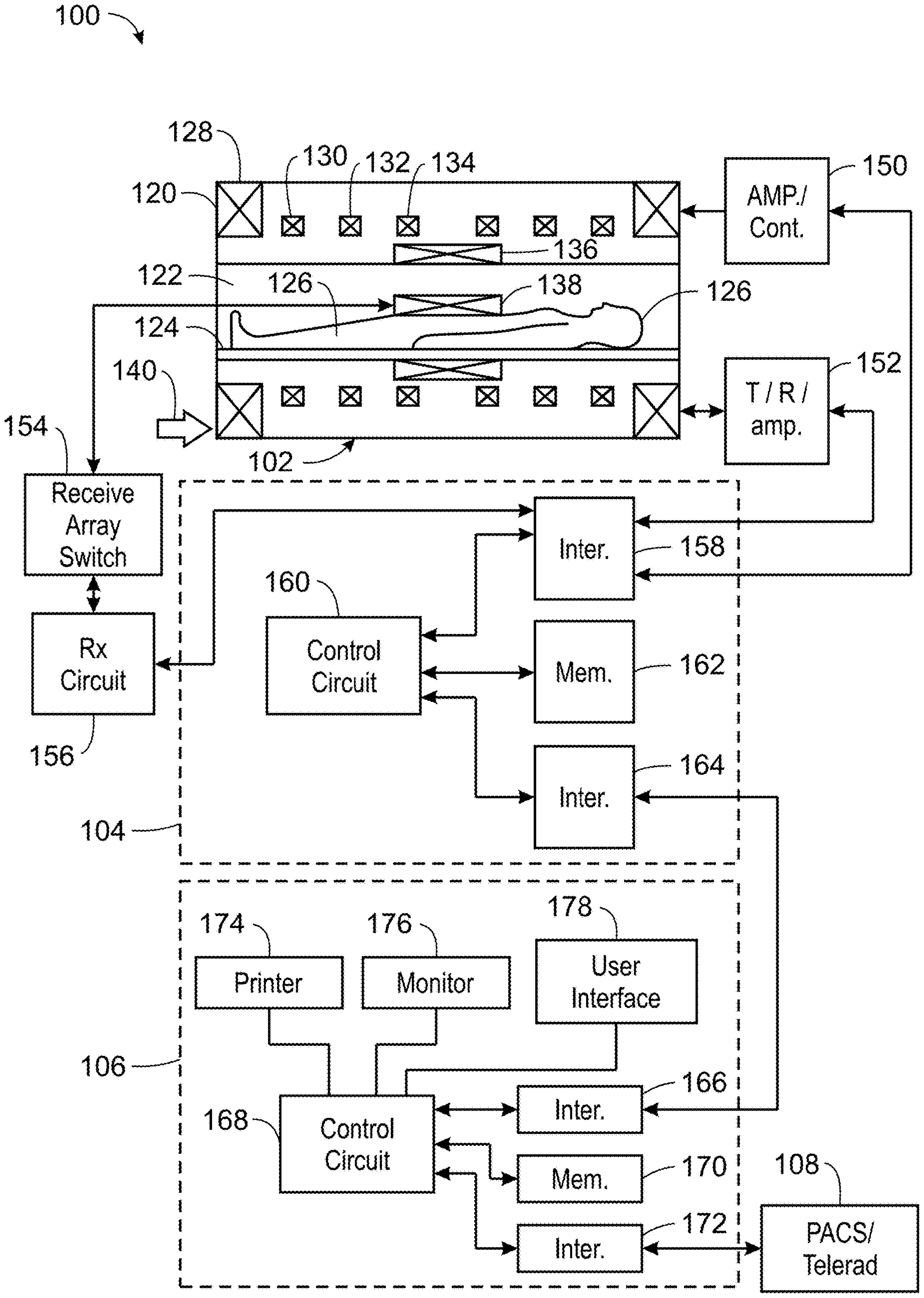
FIG. 1 illustrates an embodiment of a magnetic resonance imaging (MRI) system suitable for use with the disclosed technique.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While aspects of the following discussion are provided in the context of medical imaging, it should be appreciated that the disclosed techniques are not limited to such medical contexts. Indeed, the provision of examples and explanations in such a medical context is only to facilitate explanation by providing instances of real-world implementations and applications. However, the disclosed techniques may also be utilized in other contexts, such as image reconstruction for non-destructive inspection of manufactured parts or goods (i.e., quality control or quality review applications), and/or the non-invasive inspection of packages, boxes, luggage, and so forth (i.e., security or screening applications). In general, the disclosed techniques may be useful in any imaging or screening context or image processing or photography field where a set or type of acquired data undergoes a reconstruction process to generate an image or volume.

Deep-learning (DL) approaches discussed herein may be based on artificial neural networks, and may therefore encompass one or more of deep neural networks, fully connected networks, convolutional neural networks (CNNs), unrolled neural networks, perceptrons, encoders-decoders, recurrent networks, transformer networks, wavelet filter banks, u-nets, general adversarial networks (GANs), dense neural networks, or other neural network architectures. The neural networks may include shortcuts, activations, batch-normalization layers, and/or other features. These techniques are referred to herein as DL techniques, though this terminology may also be used specifically in reference to the use of deep neural networks, which is a neural network having a plurality of layers.

As discussed herein, DL techniques (which may also be known as deep machine learning, hierarchical learning, or deep structured learning) are a branch of machine learning techniques that employ mathematical representations of data and artificial neural networks for learning and processing such representations. By way of example, DL approaches may be characterized by their use of one or more algorithms to extract or model high level abstractions of a type of data-of-interest. This may be accomplished using one or more processing layers, with each layer typically corresponding to a different level of abstraction and, therefore potentially employing or utilizing different aspects of the initial data or outputs of a preceding layer (i.e., a hierarchy or cascade of layers) as the target of the processes or algorithms of a given layer. In an image processing or reconstruction context, this may be characterized as different layers corresponding to the different feature levels or resolution in the data. In general, the processing from one representation space to the next-level representation space can be considered as one 'stage' of the process. Each stage of the process can be performed by separate neural networks or by different parts of one larger neural network.

In MRI, noise is Gaussian in the acquired complex k-space as well as in the complex image. But the noise of the magnitude and phase images is no longer Gaussian. Denoising algorithms have been shown to be better at denoising Gaussian noise and, thus, might not be appropriate for use on magnitude and phase images. In order to address noise in its Gaussian form, techniques have been done to denoise real and imaginary channels separately.

Also, using multicomponent approach in the complex for denoising has been found to outperform other techniques, but this works on individual echoes. In the case of multiple echoes, it is possible to denoise individual echoes. However, with acceleration and deration, the signal-to-noise ratio (SNR) goes down and the later echoes have very poor SNR. Denoising these echoes would mean models would have to work aggressively which introduces blur. The level of blur and any ill effects from denoising (e.g., half pixel shift) will vary across the echoes and combining them after denoising will cause artifacts and excessive blur.

The present disclosure provides systems and methods for improving image quality of susceptibility weighted imaging (SWI) utilizing deep learning. In particular, the present disclosure provides an SWI processing pipeline that utilizes denoising (via a trained deep learning-based denoising network or model) in the complex domain (with both real and imaginary data) followed by super-resolution to overcome (e.g., remove) any blur present in the denoised complex image that might be introduced by the denoising model to render a higher resolution complex image (e.g., rendering sharp vessels).

The disclosed systems and methods include acquiring an MRI complex signal having a plurality of complex echoes of a region of interest (e.g., brain) via an MRI scanner from a single channel (e.g., element or loop) of a coil (e.g., RF receiving coil) during an SWI sequence (e.g., gradient-echo (GRE) sequence such as a three-dimensional (3D) GRE sequence). It should be noted that the disclosed systems and methods may be utilized on MRI signals acquired from multiple channels of the coil during the SWI sequence. The disclosed systems and methods also include phase filtering each complex echo of the plurality of complex echoes. The disclosed systems and methods yet further include generating a respective phase image and a respective magnitude image from each phase filtered complex echo. The disclosed systems and methods still even further include combining separately the respective magnitude images of the plurality of complex echoes with each other (e.g., via root mean square) to generate a combined magnitude image and the respective phase images of the plurality of complex echoes with each other (e.g., via averaging) to generate a combined phase image. The disclosed systems and methods still further include generating a complex image from both the combined magnitude image and the combined phase image. The disclosed systems and methods yet further include utilizing a deep learning-based denoising network to denoise the complex image to generate a denoised complex image. The disclosed systems and methods further include applying super-resolution to the denoised complex image to generate a higher resolution fully denoised complex image (e.g., relative to denoised complex image prior application of super-resolution) free of any blur.

In certain embodiments, the disclosed systems and methods even further include generating a phase image from the higher resolution fully denoised complex image, wherein the phase image is completely denoised. In certain embodiments, the phase image may be utilized solely to generate (e.g., via scaling) a phase mask. In certain embodiments, this phase mask and the respective magnitude image for each complex echo of the plurality of complex echoes are utilized to generate a SWI processed image of the region of interest. In certain embodiments, the disclosed systems and methods yet further include generating a magnitude image from the higher resolution denoised complex image, wherein the magnitude image is partially denoised. In certain embodiments, the magnitude image (with a desired percentage of residue noise (percent residue) from denoising the non-denoised complex image is added) and the phase image may be utilized to generate a phase mask. In this scenario, the phase mask in conjunction with the magnitude image (with the percent residue) are utilized to generate a SWI processed image of the region of interest. In certain embodiments, if the SNR is sufficient for the last complex echoes, individual complex echo denoising and super-resolution may be utilized.

As in SWI, with the disclosed embodiments, the magnitude image is used mostly to identify the location of the pathology. The denoised complex image (utilizing both the magnitude image (with percent residue added) and the phase image or only the phase image derived from the denoised complex image) is utilized to generate the SWI processed image. The benefit of this approach is that the magnitude image retains its texture and the person reading the image finds the processed image more natural (as opposed to excessively clean). The phase image always is made to be completely denoised as a little noise appears as hypointense spots in the SWI processed image.

SWI is an important sequence to locate bleeds. Value is added when the acquisition of data is accelerated and with thin slices to locate pathologies precisely. However, this will reduce SNR drastically. When this is extended to acquisition with deration in the number of coils and in field strength, the SNR drops even further to the point of generating non-diagnosable images. The disclosed techniques increase the quality of the image by improving the SNR in these scenarios. The disclosed techniques also reduce the artifacts imparted by the noise in phase. The disclosed techniques further render vessels sharp.

With the preceding in mind, FIG. 1 a magnetic resonance imaging (MRI) system 100 is illustrated schematically as including a scanner 102, scanner control circuitry 104, and system control circuitry 106. According to the embodiments described herein, the MRI system 100 is generally configured to perform MR imaging.

System 100 additionally includes remote access and storage systems or devices such as picture archiving and communication systems (PACS) 108, or other devices such as teleradiology equipment so that data acquired by the system 100 may be accessed on- or off-site. In this way, MR data may be acquired, followed by on- or off-site processing and evaluation. While the MRI system 100 may include any suitable scanner or detector, in the illustrated embodiment, the system 100 includes a full body scanner 102 having a housing 120 through which a bore 122 is formed. A table 124 is moveable into the bore 122 to permit a patient 126 (e.g., subject) to be positioned therein for imaging selected anatomy within the patient.

Scanner 102 includes a series of associated coils for producing controlled magnetic fields for exciting the gyromagnetic material within the anatomy of the patient being imaged. Specifically, a primary magnet coil 128 is provided for generating a primary magnetic field, $B_0$, which is generally aligned with the bore 122. A series of gradient coils 130, 132, and 134 permit controlled magnetic gradient fields to be generated for positional encoding of certain gyromagnetic nuclei within the patient 126 during examination sequences. A radio frequency (RF) coil 136 (e.g., RF transmit coil) is configured to generate radio frequency pulses for exciting the certain gyromagnetic nuclei within the patient. In addition to the coils that may be local to the scanner 102, the system 100 also includes a set of receiving coils or RF receiving coils 138 (e.g., an array of coils) configured for placement proximal (e.g., against) to the patient 126. As an example, the receiving coils 138 can include cervical/thoracic/lumbar (CTL) coils, head coils, single-sided spine coils, and so forth. Generally, the receiving coils 138 are placed close to or on top of the patient 126 so as to receive the weak RF signals (weak relative to the transmitted pulses generated by the scanner coils) that are generated by certain gyromagnetic nuclei within the patient 126 as they return to their relaxed state.

The various coils of system 100 are controlled by external circuitry to generate the desired field and pulses, and to read emissions from the gyromagnetic material in a controlled manner. In the illustrated embodiment, a main power supply 140 provides power to the primary field coil 128 to generate the primary magnetic field, $B_0$. A power input (e.g., power from a utility or grid), a power distribution unit (PDU), a power supply (PS), and a driver circuit 150 may together provide power to pulse the gradient field coils 130, 132, and 134. The driver circuit 150 may include amplification and control circuitry for supplying current to the coils as defined by digitized pulse sequences output by the scanner control circuitry 104.

Another control circuit 152 is provided for regulating operation of the RF coil 136. Circuit 152 includes a switching device for alternating between the active and inactive modes of operation, wherein the RF coil 136 transmits and does not transmit signals, respectively. Circuit 152 also includes amplification circuitry configured to generate the RF pulses. Similarly, the receiving coils 138 are connected to switch 154, which is capable of switching the receiving coils 138 between receiving and non-receiving modes. Thus, the receiving coils 138 resonate with the RF signals produced by relaxing gyromagnetic nuclei from within the patient 126 while in the receiving mode, and they do not resonate with RF energy from the transmitting coils (i.e., coil 136) so as to prevent undesirable operation while in the non-receiving mode. Additionally, a receiving circuit 156 is configured to receive the data detected by the receiving coils 138 and may include one or more multiplexing and/or amplification circuits.

It should be noted that while the scanner 102 and the control/amplification circuitry described above are illustrated as being coupled by a single line, many such lines may be present in an actual instantiation. For example, separate lines may be used for control, data communication, power transmission, and so on. Further, suitable hardware may be disposed along each type of line for the proper handling of the data and current/voltage. Indeed, various filters, digitizers, and processors may be disposed between the scanner and either or both of the scanner and system control circuitry 104, 106.

As illustrated, scanner control circuitry 104 includes an interface circuit 158, which outputs signals for driving the gradient field coils and the RF coil and for receiving the data representative of the magnetic resonance signals produced in examination sequences. The interface circuit 158 is coupled to a control and analysis circuit 160. The control and analysis circuit 160 executes the commands for driving the circuit 150 and circuit 152 based on defined protocols selected via system control circuit 106.

Control and analysis circuit 160 also serves to receive the magnetic resonance signals and performs subsequent processing before transmitting the data to system control circuit 106. Scanner control circuit 104 also includes one or more memory circuits 162, which store configuration parameters, pulse sequence descriptions, examination results, and so forth, during operation.

Interface circuit 164 is coupled to the control and analysis circuit 160 for exchanging data between scanner control circuitry 104 and system control circuitry 106. In certain embodiments, the control and analysis circuit 160, while illustrated as a single unit, may include one or more hardware devices. The system control circuit 106 includes an interface circuit 166, which receives data from the scanner control circuitry 104 and transmits data and commands back to the scanner control circuitry 104. The control and analysis circuit 168 may include a CPU in a multi-purpose or application specific computer or workstation. Control and analysis circuit 168 is coupled to a memory circuit 170 to store programming code for operation of the MRI system 100 and to store the processed image data for later reconstruction, display and transmission. The programming code may execute one or more algorithms that, when executed by a processor, are configured to perform reconstruction of acquired data as described below. In certain embodiments, the memory circuit 170 may store one or more neural networks for reconstruction of acquired data as described below. In certain embodiments, image reconstruction may occur on a separate computing device having processing circuitry and memory circuitry.

An additional interface circuit 172 may be provided for exchanging image data, configuration parameters, and so forth with external system components such as remote access and storage devices 108. Finally, the system control and analysis circuit 168 may be communicatively coupled to various peripheral devices for facilitating operator interface and for producing hard copies of the reconstructed images. In the illustrated embodiment, these peripherals include a printer 174, a monitor 176, and user interface 178 including devices such as a keyboard, a mouse, a touchscreen (e.g., integrated with the monitor 176), and so forth.

Figure 2:
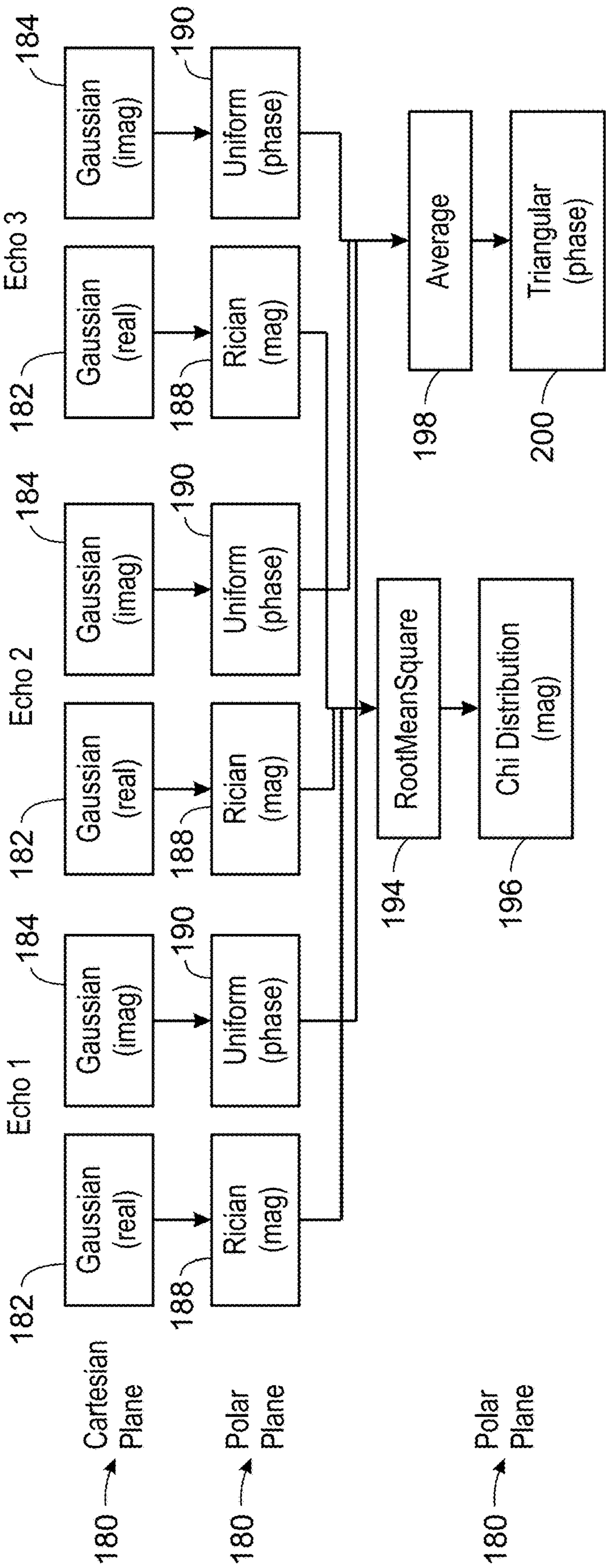
FIG. 2 illustrates a schematic diagram depicting noise properties along SWI multi-echo processing, in accordance with aspects of the present disclosure.

FIG. 2 illustrates a schematic diagram depicting noise properties along SWI multi-echo processing (e.g., for the disclosed methods 212 and 268 in FIGS. 6A, 6B, 7A, and 7B). To study the noise properties along the SWI multi-echo processing, a few assumptions are made. First, three echoes are acquired. In certain embodiments, the number of echoes acquired may be different. Second, the noise in all of the real channels and all of the imaginary channels for all of the echoes are independent Gaussian distributions with the SNR decreasing for later echoes. Third, the noise properties for a single channel are straightforward. It is assumed that with multiple channels (with calibration-based channel combination), the noise remains Gaussian even after this channel combination.

As depicted in FIG. 2, in a Cartesian plane 180 for both a real channel 182 and an imaginary channel 184 of each echo (e.g., Echo 1, Echo 2, and Echo 3) the noise distribution is a Gaussian distribution. In the polar plane 186, for a magnitude image 188 (reconstructed from the real channel 182) of each echo the noise distribution becomes a Rician distribution. In the polar plane 186, for a phase image 190

(generated by phase filtering the imaginary channel 184) of each echo the noise distribution becomes a uniform distribution.

As depicted in FIG. 2, the magnitude images 188 of all of the echoes are combined utilizing root mean square 194 (i.e., square root of the mean square of the magnitude images) to generate a combined magnitude image 196 in the polar plane 86. This enables structural information to be gathered from the first echoes and susceptibility information to be gathered from the later ones. The noise distribution for the combined magnitude image 196 becomes a chi distribution. As depicted in FIG. 2, the phase images 190 of all the echoes are combined and averaged 198 to generate a combined phase image 200 in the polar plane. The noise distribution for the combined phase image 196 becomes a triangular distribution. When the combined magnitude image 196 and the combined phase image 200 are combined and then brought back into the Cartesian plane 180 applying the following function, r*exp(jθ), to generate a complex image, where r is the magnitude, j is the square root of −1, and θ is angle relative to the real axis.

Figure 3:
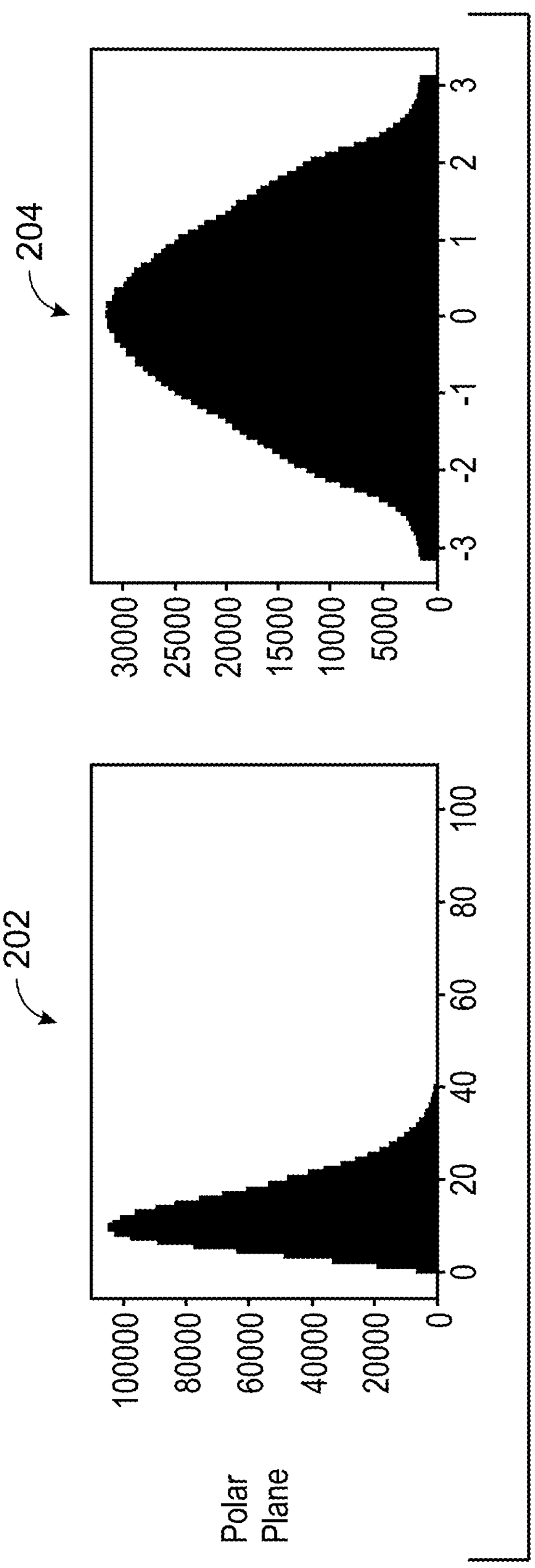
FIG. 3 illustrates noise histograms representing obtained noise (based on the difference between echoes of clean data and data of noise added echoes) for a magnitude and phase of combined echoes, in accordance with aspects of the present disclosure.
Figure 4:
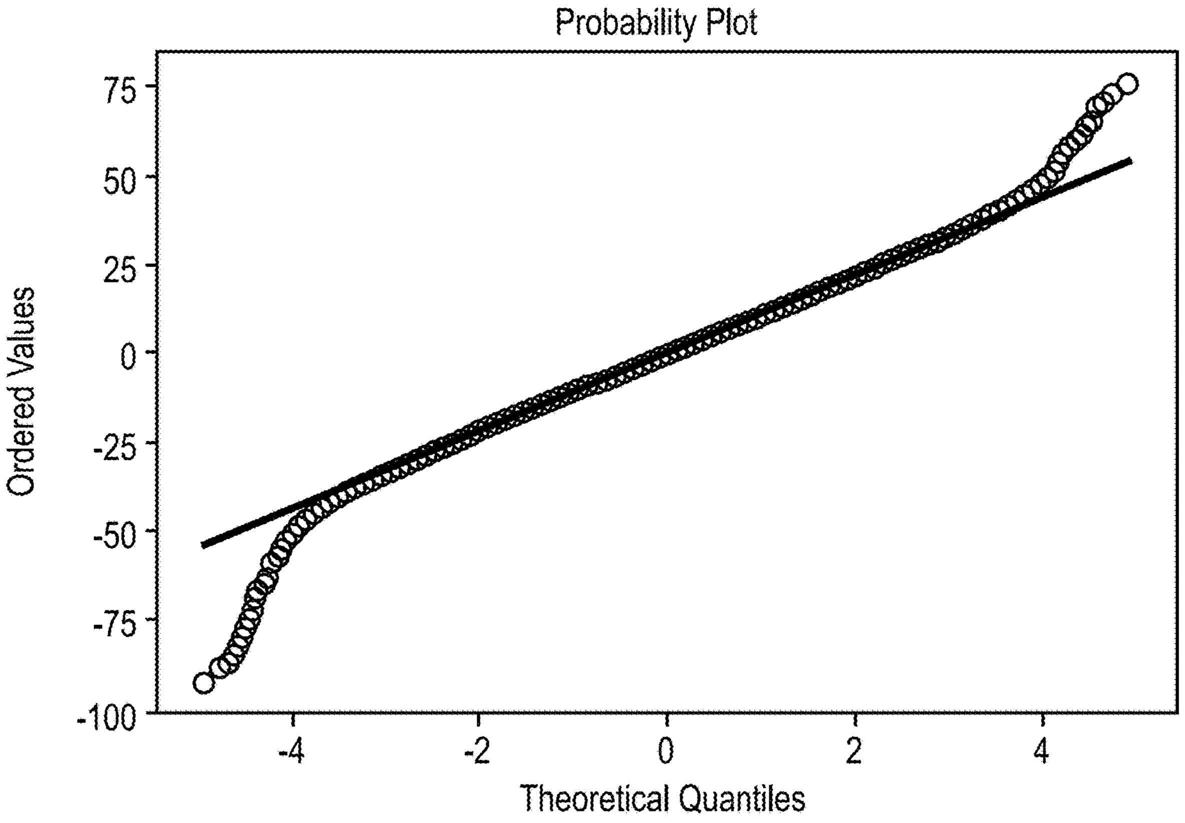
FIG. 4 illustrates a Q-Q plot of the obtained noise (based on the difference between echoes of clean data and data of noise added echoes) in the imaginary channel against the imaginary channel of the noise added echoes, in accordance with aspects of the present disclosure.
Figure 5:
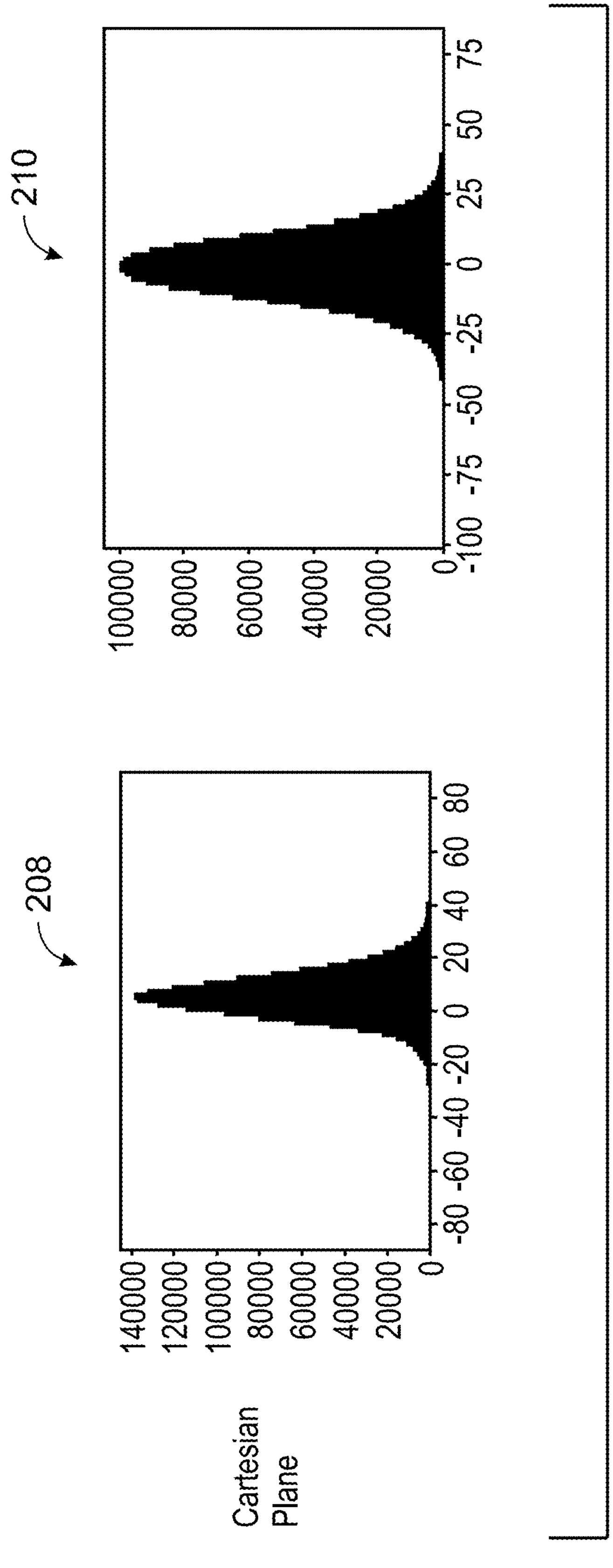
FIG. 5 illustrates noise histograms representing obtained noise (based on the difference between echoes of clean data and data of noise added echoes) for real of combined echoes and imaginary of combined echoes, in accordance with aspects of the present disclosure.

The noise distribution in the complex image generated in FIG. 2 is too complex to be calculated. Thus, simulations are utilized to study the noise distribution in the complex image. In studying the noise properties with simulation, a 3 echo, single channel, SWI acquisition was utilized as clean data. Independent Gaussian noise was added to the real channels and the imaginary channels with increasing standard deviation for the later echoes. The echoes of the clean data had the magnitude images and the phase images combined separately as described in FIG. 2 utilizing root mean square and averaging, respectively. Also, the noise added echoes had the magnitude images and the phase images combined separately as described in FIG. 2 utilizing root mean square and averaging, respectively. The clean data was subtracted from the noisy data to obtain the noise for the denoising models (e.g., trained deep-learning based network or models) to remove. FIG. 3 illustrates noise histograms 202 and 204 representing this obtained noise (based on the difference between the clean data and noise added data) for the real channel of the combined echoes and the imaginary channel of the combined echoes, respectively. As depicted in FIG. 3, the noise distribution is close to Gaussian in the noise histograms 202 and 204 but is definitely not Gaussian. FIG. 4 illustrates a QQ plot 206. The QQ plot 206 is plotting the obtained noise (based on the difference between the clean data and noise added data) in the imaginary channel against the imaginary channel of the noise added echoes. The QQ plot 206 shows the ambiguity along the tails. Statistical tests such as the Shapiro-Wilk test has a p-value of 1.99*e−23. The QQ plot 206 and this p-value prove that the distribution in the obtained noise in the real and imaginary channels is not Gaussian. FIG. 5 illustrates noise histograms 208 and 210 representing this obtained noise (based on the difference between the clean data and noise added data) for the magnitude of the combined echoes and the phase of the combined echoes, respectively. The noise distribution in the noise histogram 208 is Rician. The noise distribution in the noise histogram 210 is uniform.

It was found that deep learning-based denoising models trained with Gaussian noise simulation and augmented with point spread functions were effective at denoising a complex image derived from a combined magnitude image and a combined phase image of a plurality of echoes (e.g., as obtained in FIG. 2).

Figure 6A:
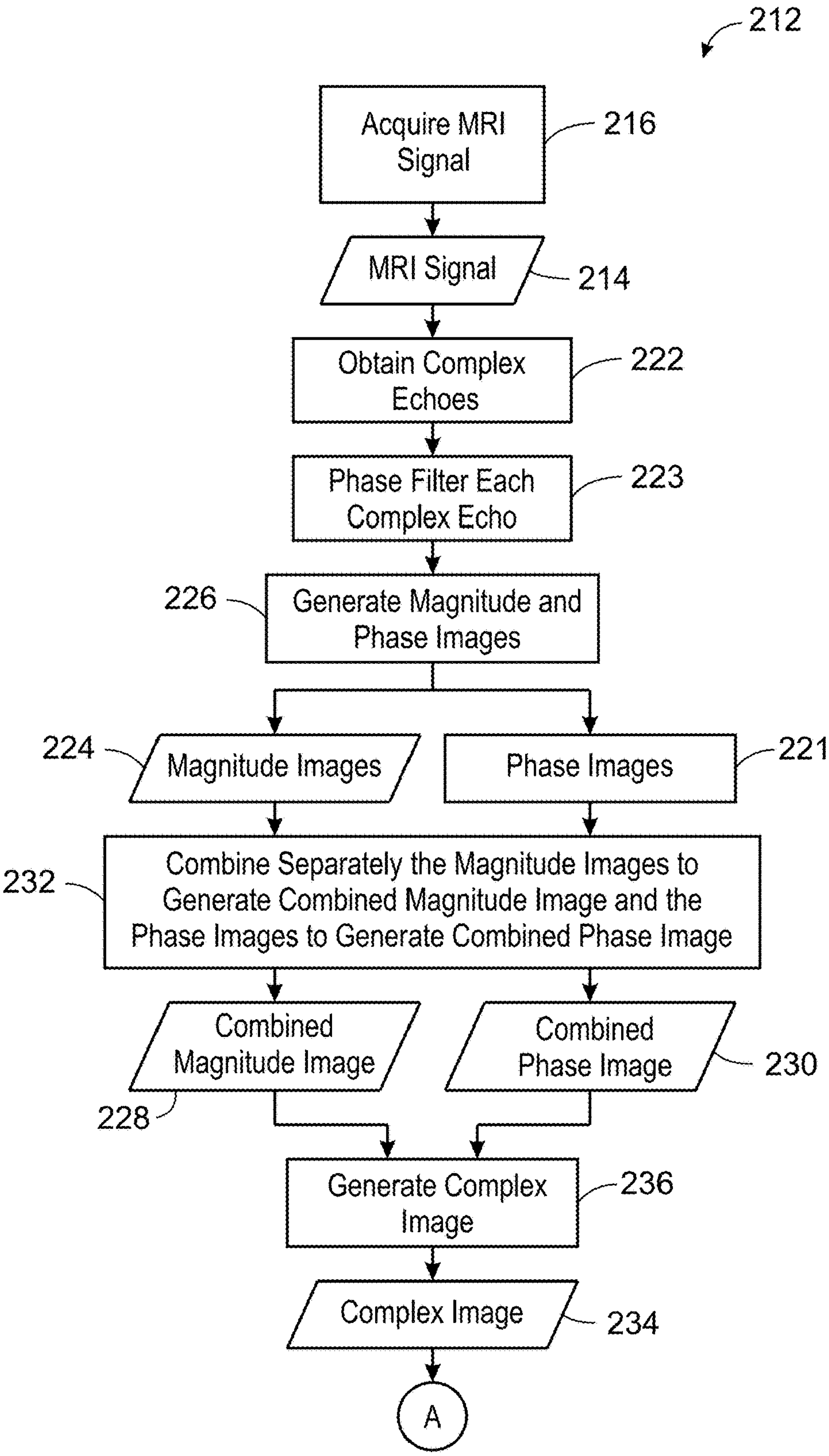
FIGS. 6A and 6B illustrate a flow chart of a method for improving image quality of SWI (e.g., generating a denoised phase image and a denoised magnitude image from a complex image), in accordance with aspects of the present disclosure.
Figure 6B:
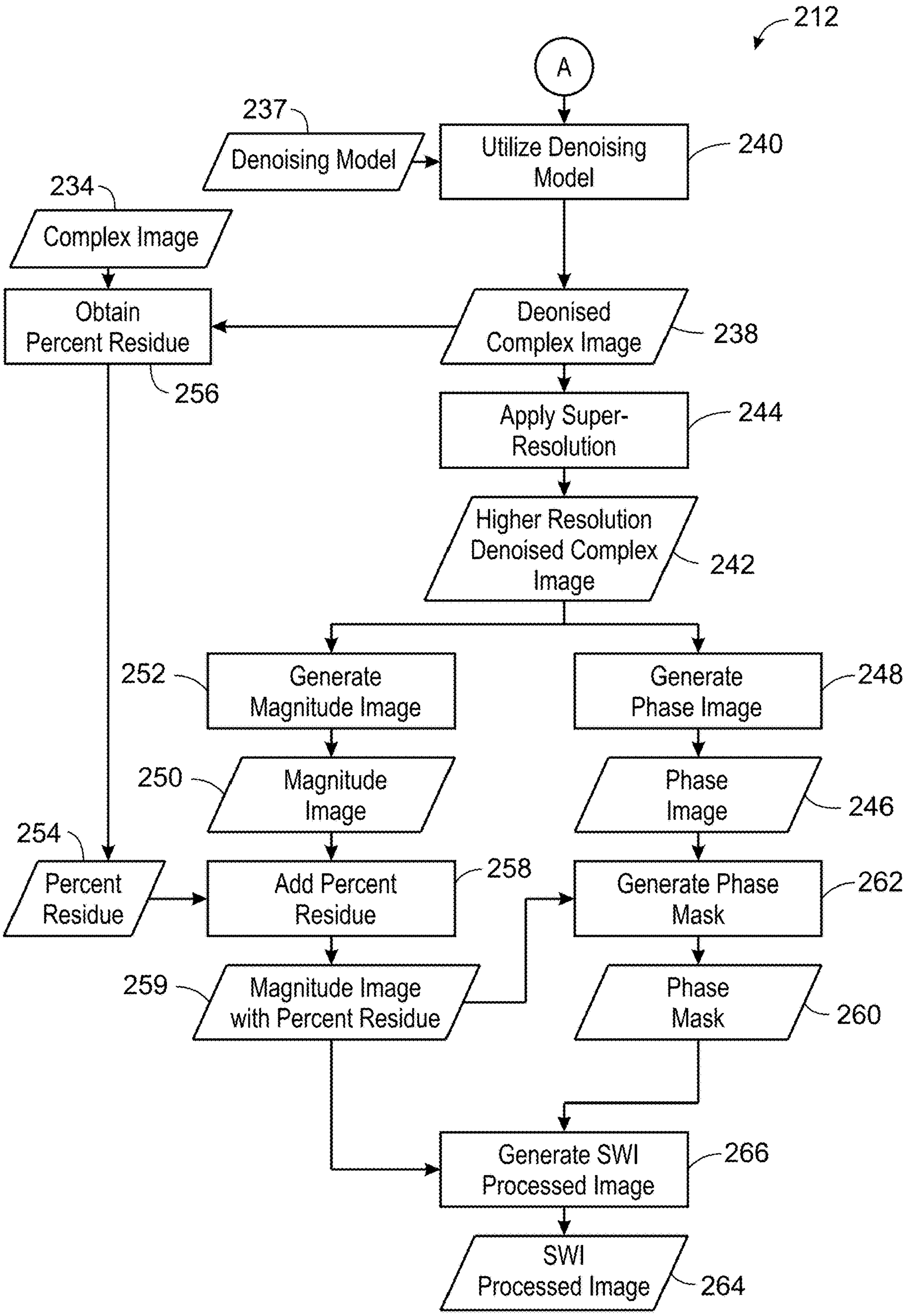

FIGS. 6A and 6B illustrate a flow chart of a method 212 for improving image quality of SWI. One or more steps of the method 212 may be performed by processing circuitry of the magnetic resonance imaging system 100 in FIG. 1 or a remote computing system. One or more steps of the method 212 may be performed simultaneously and/or in a different order shown in FIGS. 6A and 6B. Although described with respect to data acquired from multiple echoes from a single channel of a coil (e.g. RF receiving coil), the method 212 may be utilized on data acquired from multiple echoes from multiple channels.

The method 212 includes acquiring an MRI complex signal 214 having a plurality of echoes of a region of interest (e.g., brain) via an MRI scanner (e.g., MRI scanner 102 in FIG. 1) from a single channel (e.g., element or loop) of a coil (e.g., RF receiving coil) during an SWI sequence (e.g., gradient-echo (GRE) sequence such as a three-dimensional (3D) GRE sequence) (block 216). The method 212 also includes obtaining a plurality of complex echoes from the MRI signal (block 222).

The method 212 further includes phase filtering each complex echo of the plurality of complex echoes (block 223). The method 212 yet further includes generating (e.g., reconstructing) a respective magnitude image 224 and a respective phase image 221 from each phase filtered complex echo (block 226). The method 212 still even further includes combining separately the respective magnitude images 224 of the plurality of complex echoes with each other to generate a combined magnitude image 228 and the respective phase images 221 of the plurality of complex echoes with each other to generate a combined phase image 230 (block 232). In certain embodiments, the combined magnitude image 228 is derived by utilizing root mean square (i.e., square root of the mean square of the magnitude images 224) on the magnitude images 224. In certain embodiments, the combined phase image 230 is derived by combining and averaging the phase images 221.

The method 212 still further includes generating a complex image 234 (e.g., non-denoised complex image) from both the combined magnitude image 228 and the combined phase image 230 (block 236). In certain embodiments, the combined magnitude image 228 and the combined phase image 230 are combined and then subjected to application of the following function, r*exp(jθ), to generate the complex image 234. The method 212 yet further includes utilizing a deep learning-based denoising network or model 237 (e.g. trained with Gaussian noise simulation sufficiently augmented) to denoise the complex image 234 to generate a denoised complex image 238 (block 240). The method 212 further includes applying super-resolution to the denoised complex image 238 to generate a higher resolution fully denoised complex image 242 (e.g., relative to denoised complex image 238 prior application of super-resolution) free of any blur (block 244).

The method 212 further includes generating a phase image 246 (e.g., filtered phase image) from the higher resolution denoised complex image 242 utilizing phase filtering (block 248) The phase image 246 is always completely denoised. The method 212 yet further includes generating a magnitude image 250 from the higher resolution denoised complex image 242 (block 252). The magnitude image 250 is partially denoised. In certain embodiments, the method 212 includes obtaining a desired percentage of residue noise (percent residue) 254 from the denoising of the non-denoised complex image 234 to obtain the denoise complex image 238 (block 256). The method 212 also includes adding the percent residue 254 to the magnitude image 250 to generate magnitude image 250 (e.g., with percent residue 254) (block 258). The percent residue 254 provides texture. The method 212 further includes utilizing both the magnitude image 259 with the percent residue added and the phase image 246 to generate a phase mask 260 (block 262). The magnitude information from the magnitude image 259 (with the percent residue added) is utilized to suppress background in generating the phase mask 260. The method 212 even further includes generating a SWI processed image 264 of the region of interest utilizing the phase mask 260 and the magnitude image 250 (with the percent residue 254 added) (block 266). In particular, the magnitude image 250 (with the percent residue 254 added) is multiplied a certain number of times by the phase mask 260.

Figure 7A:
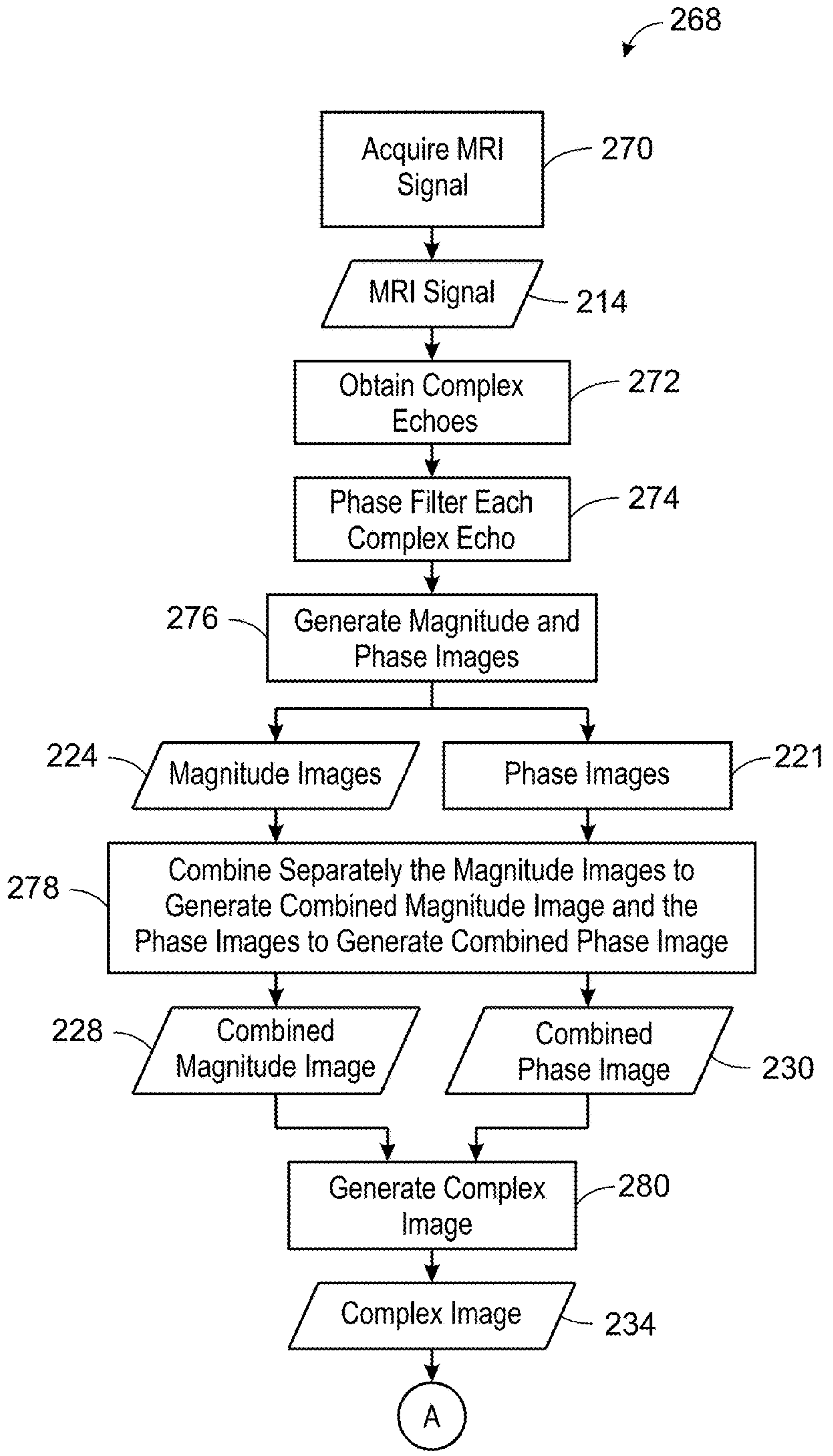
FIGS. 7A and 7B illustrate a flow chart of a method for improving image quality of SWI (e.g., generating only a denoised phase image from a complex image), in accordance with aspects of the present disclosure.
Figure 7B:
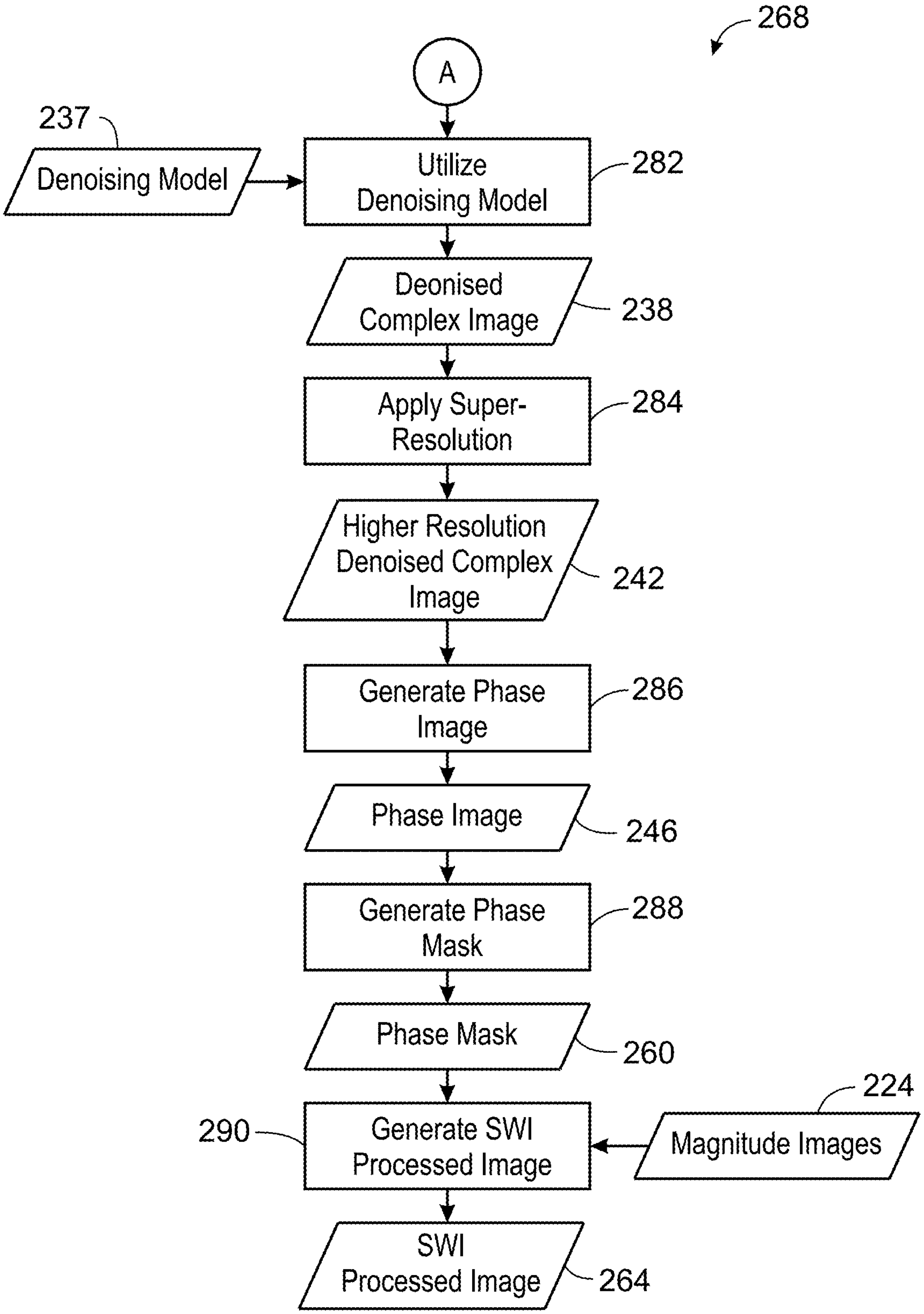

FIGS. 7A and 7B illustrate a flow chart of a method 268 for improving image quality of SWI. One or more steps of the method 268 may be performed by processing circuitry of the magnetic resonance imaging system 100 in FIG. 1 or a remote computing system. One or more steps of the method 268 may be performed simultaneously and/or in a different order shown in FIGS. 7A and 7B. Although described with respect to data acquired from multiple echoes from a single channel of a coil (e.g., RF receiving coil), the method 268 may be utilized on data acquired from multiple echoes from multiple channels.

The method 268 includes acquiring an MRI complex signal 214 having a plurality of echoes of a region of interest (e.g., brain) via an MRI scanner (e.g., MRI scanner 102 in FIG. 1) from a single channel (e.g., element or loop) of a coil (e.g., RF receiving coil) during an SWI sequence (e.g., gradient-echo (GRE) sequence such as a three-dimensional (3D) GRE sequence) (block 270). The method 268 also includes obtaining a plurality of complex echoes from the MRI signal (block 272).

The method 268 further includes phase filtering each complex echo of the plurality of complex echoes (block 274). The method 268 yet further includes generating (e.g., reconstructing) a respective magnitude image 224 and a respective phase image 221 from each phase filtered complex echo (block 276). The method 268 still even further includes combining separately the respective magnitude images 224 of the plurality of complex echoes with each other to generate a combined magnitude image 228 and the respective phase images 221 of the plurality of complex echoes with each other to generate a combined phase image 230 (block 278). In certain embodiments, the combined magnitude image 228 is derived by utilizing root mean square (i.e., square root of the mean square of the magnitude images 224) on the magnitude images 224. In certain embodiments, the combined phase image 230 is derived by combining and averaging the phase images 220.

The method 268 still further includes generating a complex image 234 (e.g., non-denoised complex image) from both the combined magnitude image 228 and the combined phase image 230 (block 280). In certain embodiments, the combined magnitude image 228 and the combined phase image 230 are combined and then subjected to application of the following function, $r*\exp(j\theta)$, to generate the complex image 234. The method 268 yet further includes utilizing a deep learning-based denoising network or model 237 (e.g. trained with Gaussian noise simulation sufficiently augmented) to denoise the complex image 234 to generate a denoised complex image 238 (block 282). The method 268 further includes applying super-resolution to the denoised complex image 238 to generate a higher resolution fully denoised complex image 242 (e.g., relative to denoised complex image 238 prior application of super-resolution) free of any blur (block 284).

The method 268 further includes generating a phase image 246 (e.g., filtered phase image) from the higher resolution denoised complex image 242 utilizing phase filtering (block 286) The phase image 246 is always completely denoised. The method 268 further includes utilizing only the phase image 246 to generate a phase mask 260 (block 288). The method 268 even further includes generating a SWI processed image 264 of the region of interest utilizing the phase mask 260 and the respective magnitude image 224 for each echo of the plurality of echoes (block 290). In particular, the respective magnitude images 224 are multiplied a certain number of times by the phase mask 260.

Figure 8:
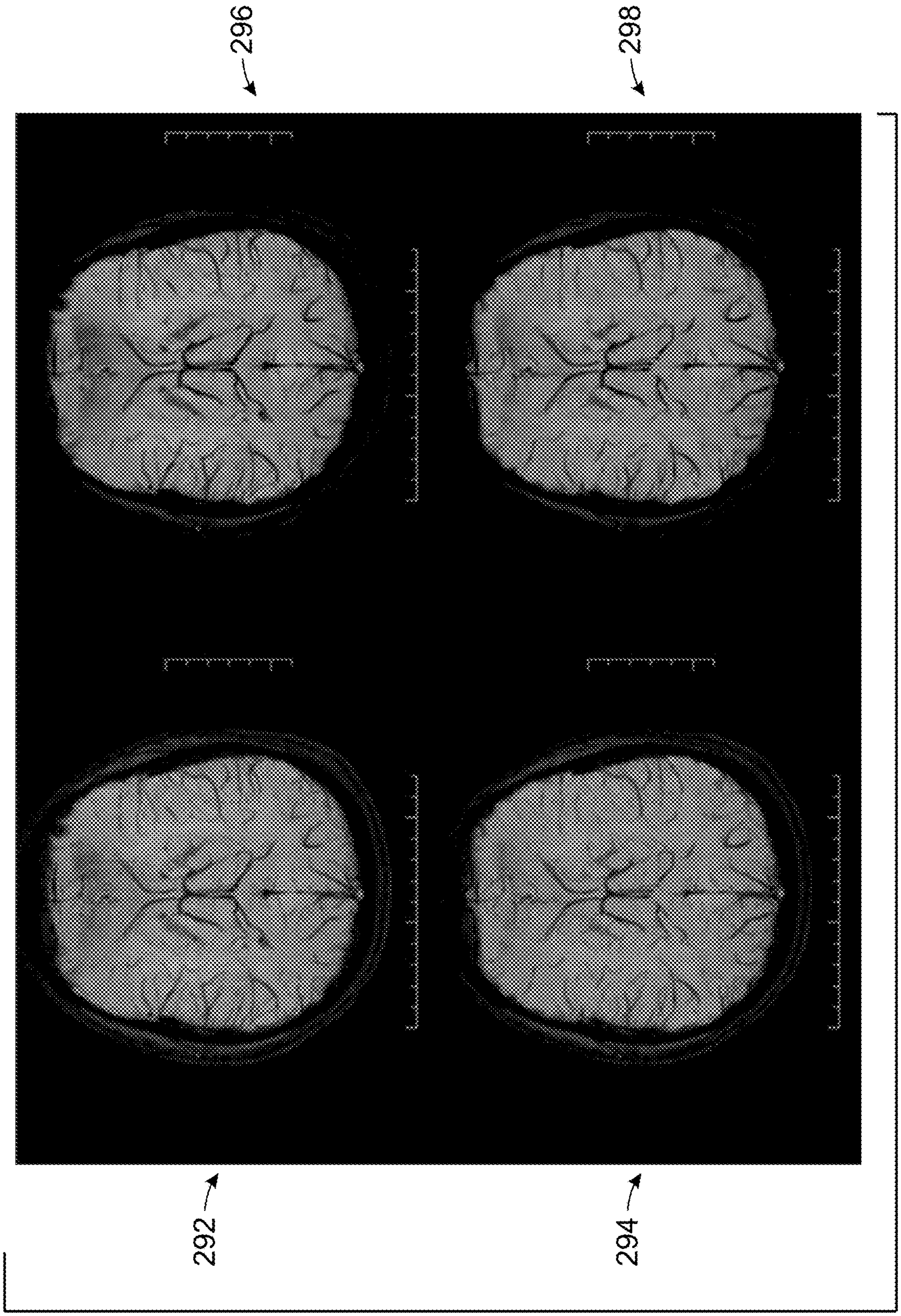
FIG. 8 depicts minimal intensity projection images derived from SWI images generated with or without utilizing the disclosed techniques.

FIG. 8 depicts minimal intensity projection images derived from SWI images generated with or without utilizing the disclosed techniques (e.g., the method 212 in FIGS. 6A and 6B). The images were acquired utilizing a 1.5 Tesla (T) MRI scanner using a head neck unit coil. The acquisition was a 512×384 acquisition with an array coil spatial sensitivity encoding (ASSET) acceleration of 2. The acquisition also had 5 echoes, flip angle of 20 degrees, an echo time (TE) of 46.6 milliseconds (ms), 2 millimeter (mm) slice thickness, 32 locs (slices) per slab, and a total acquisition time of 5 minutes.

Image 292 and 294 are minimal intensity projection images (e.g., of a brain) obtained from a typical SWI processed images. Images 296 and 298 are minimal intensity projection images (e.g., of the brain) obtained from SWI processed images processed utilizing the method 212 in FIGS. 6A and 6B. In particular, denoising was employed after echo combination (i.e., denoising of the complex image generated from both the combined magnitude image and the combined phase image of the plurality of echoes). The denoised results were only used for phase map generation. In particular, the denoised phase image generated from the complex image was solely used to generate the phase mask and the phase mask and the magnitude images derived from the echoes were utilized to generate the SWI processed images used to generate the minimal projection images 296 and 298. Minimal projection images 296 and 298 illustrate that the disclosed techniques do not affect the sharpness, which is important in SWI.

Figure 9:
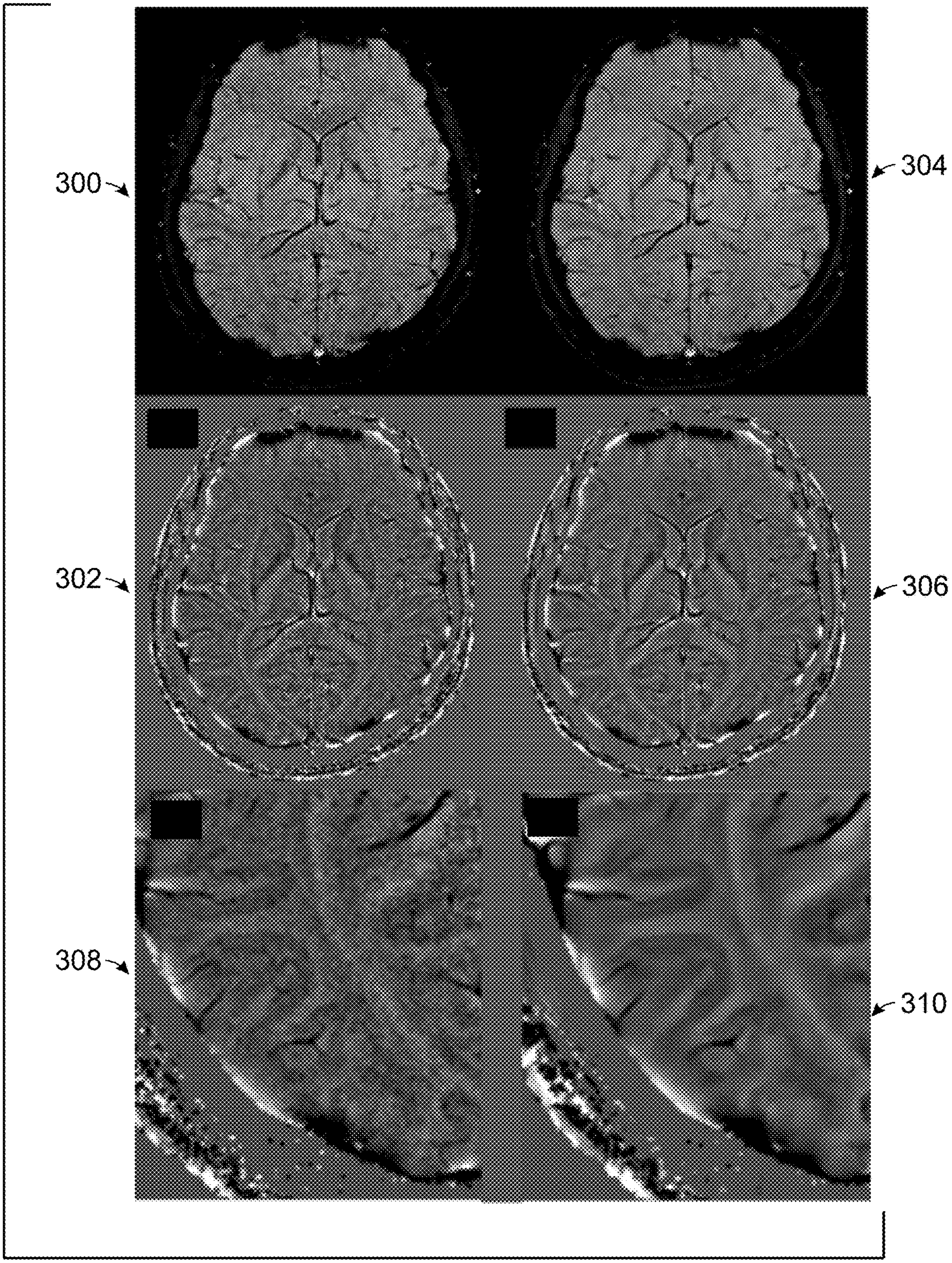
FIG. 9 depicts SWI images and phase images generated with or without utilizing the disclosed techniques.

FIG. 9 depicts SWI images and phase images generated with or without utilizing the disclosed techniques (e.g., the method 212 in FIGS. 6A and 6B). The images were acquired utilizing a 1.5 Tesla (T) MRI scanner using a head neck unit coil. The acquisition was a 512×512 acquisition with an array coil spatial sensitivity encoding (ASSET) acceleration of 2. The acquisition also had 5 echoes, flip angle of 20 degrees, an echo time (TE) of 46.6 ms, 2 mm slice thickness, 24 locs (slices) per slab, and a total acquisition time of 4 minutes and 30 seconds.

Image 300 is a SWI image derived with typical SWI processing. Image 302 is a phase image utilized in obtaining the SWI image 300. Image 304 is a SWI image derived from processing utilizing the method 212 in FIGS. 6A and 6B. In particular, denoising was employed after echo combination (i.e., denoising of the complex image generated from both the combined magnitude image and the combined phase image of the plurality of echoes). Image 306 is a phase image (denoised and super-resolution phase image) utilized in obtaining the SWI image 304. Image 308 is a zoomed cortical from the image 302. Image 310 is a zoomed cortical form the image 306. Images 308 and 310 enable a better look at grey white matter differentiation. A comparison of the images illustrates that the SNR of SWI processed images is greater utilizing the disclosed techniques (i.e., the SNR is greater in the images 304 and 306 compared to 302 and 304).

Also, the grey white matter differentiation in the cortical region is better in the phase image 310 than the phase image 308.

Figure 10:
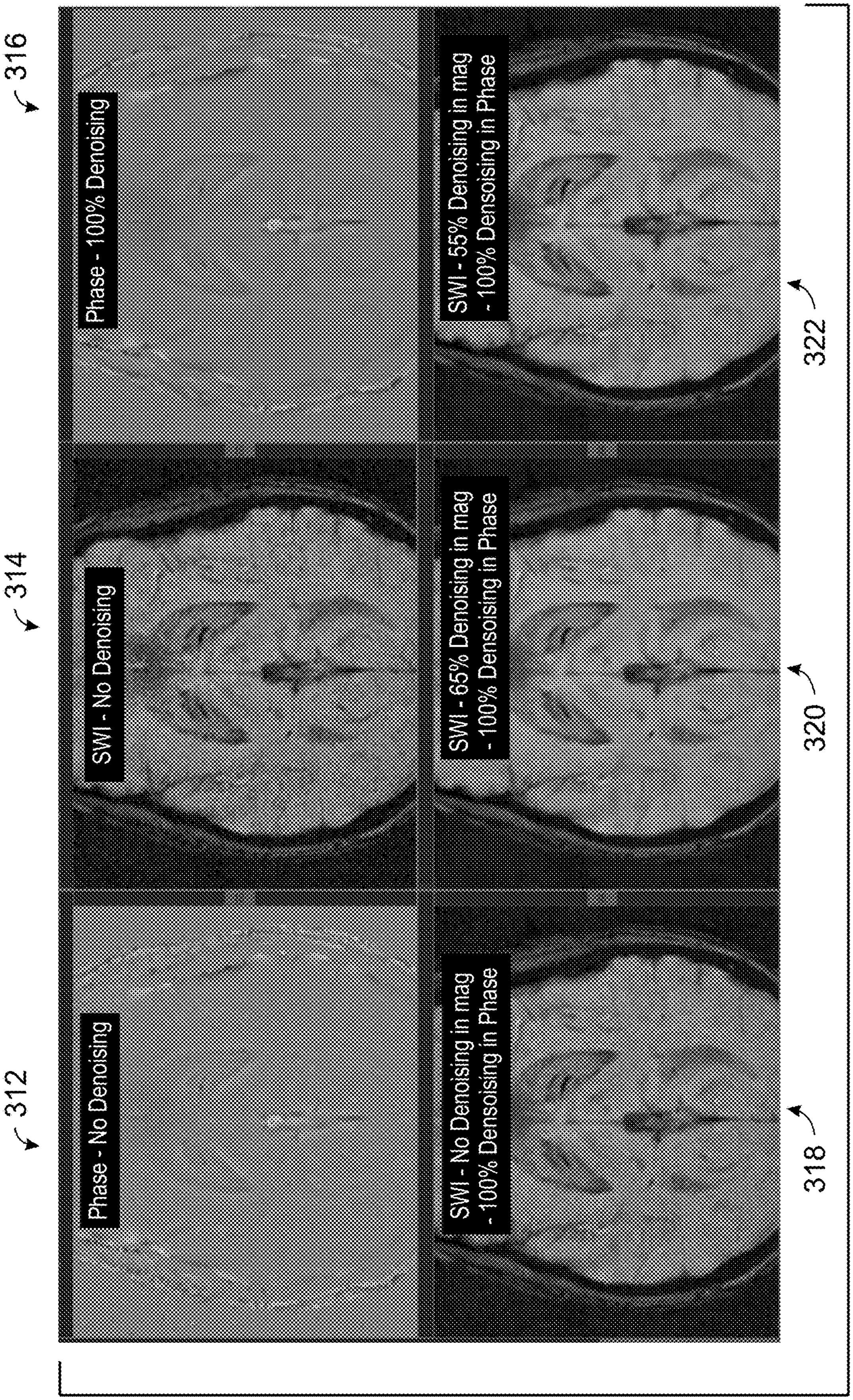
FIG. 10 depicts phase and SWI images acquired with or without denoising.

FIG. 10 depicts phase and SWI images acquired with or without denoising. The images were acquired utilizing a 1.5 Tesla (T) MRI scanner using a body coil. The acquisition was a 356×206 acquisition. The acquisition also had 3 echoes, flip angle of 20 degrees, an echo time (TE) of 34.1 ms, a repetition time (TR) of 49.6 ms, and 38 locs (slices) per slab. The complex image utilized for these images is generated from both the combined magnitude image and the combined phase image of the plurality of echoes as described above.

Image 312 is a phase image derived from the complex image without denoising (and super-resolution). Image 314 is a SWI image derived from both a magnitude image and a phase mask (derived from a phase image) derived from the complex image without any denoising. Image 316 is a phase image derived from the complex image with complete (100 percent) denoising and super-resolution applied. Image 318 is a SWI image derived from both the magnitude images of the echoes (without denoising) and a phase mask (derived from a phase image derived from the complex image after denoising and super-resolution). Image 320 is a SWI image derived from both a magnitude image and a phase mask (derived from a phase image) derived from the complex image after denoising and super-resolution. There was 65 percent denoising in the magnitude image used to derive the image 320. Image 322 is a SWI image derived from both a magnitude image and a phase mask (derived from a phase image) derived from the complex image after denoising and super-resolution. There was 55 percent denoising in the magnitude image used to derive the image 322. The SNR and sharpness is improved in the image 316 compared to the image 312. Similarly, the SNR and sharpness is improved to varying levels in the images 318, 320, and 322 compared to the image 314.

Figure 11:
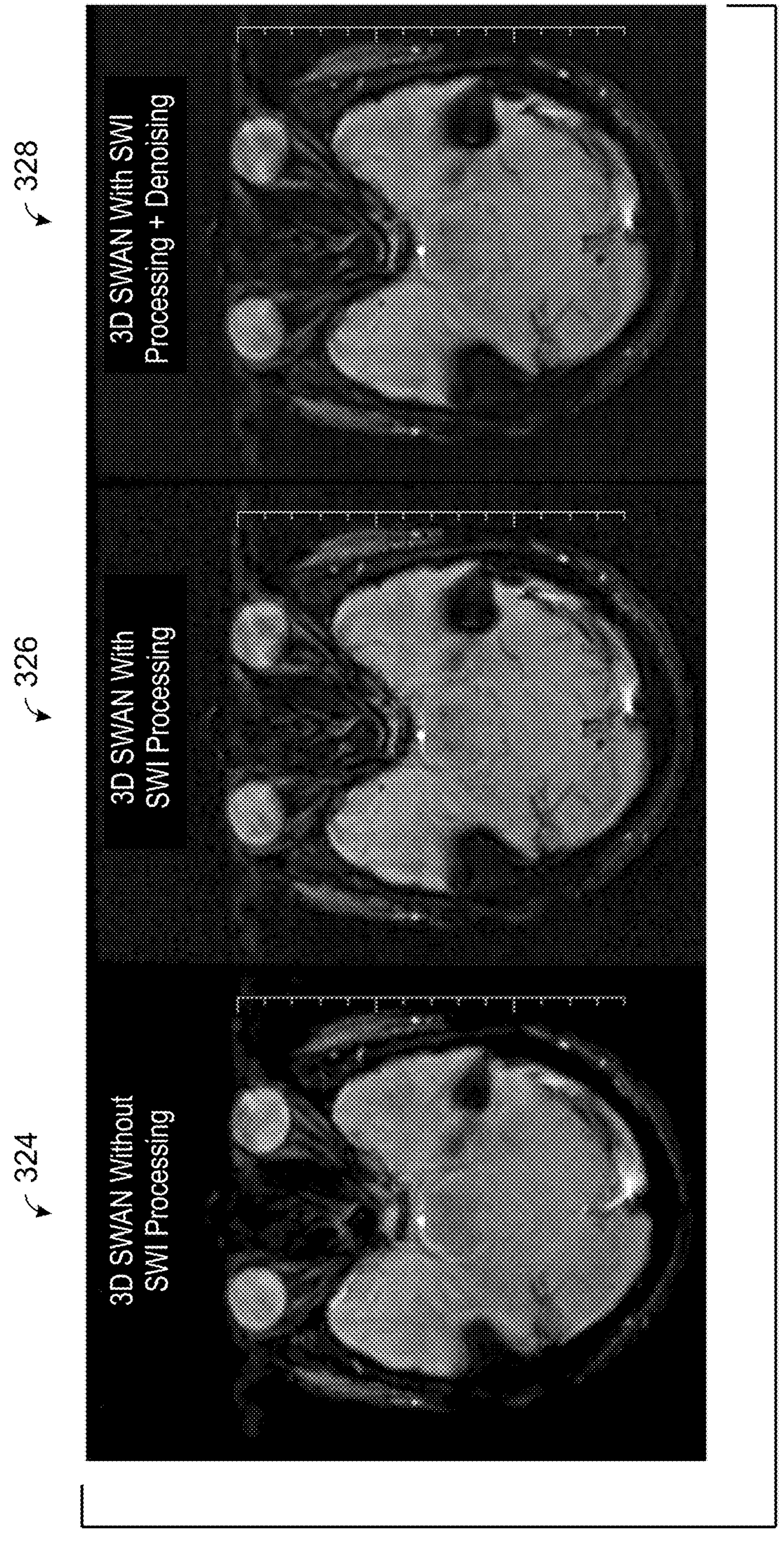
FIG. 11 depicts three-dimensional (3D) images acquired with a susceptibility weighted angiography (SWAN) sequence with or without different SWI processing.

FIG. 11 depicts 3D images acquired with a susceptibility weighted angiography (SWAN) sequence with or without different SWI processing. The images were acquired utilizing a 0.5 Tesla (T) MRI scanner using a head neck unit coil. The acquisition was a 256×136 acquisition utilizing a SWAN sequence (i.e., a high-resolution 3D multi-echo gradient echo sequence). The acquisition also had 3 echoes, flip angle of 30 degrees, an echo time (TE) of 90 ms, a repetition time (TR) of 109.5 ms, and 34 locs (slices) per slab.

Image 324 is a 3D SWAN image without SWI processing. Image 326 is a 3D SWAN image with SWI processing but without denoising. In particular, the complex image utilized for the image 326 is generated from both the combined magnitude image and the combined phase image of the plurality of echoes as described above. Image 328 is a 3D SWAN image with SWI processing and denoising (and super-resolution) as described above. In particular, the complex image utilized for the image 328 is generated from both the combined magnitude image and the combined phase image of the plurality of echoes and subjected to denoising (and super-resolution).

It should be noted that the techniques described above may be utilized on any multi-echo acquisition sequence (even those that are magnitude dependent sequences). For example, the above techniques may be utilized on scan data acquired utilizing multiple echo recombined gradient echo (MERGE) which is spoiled T2*-weighted sequence utilized for spinal and musculoskeletal imaging.

Technical effects of the disclosed subject matter include providing an SWI processing pipeline that utilizes denoising (via a trained deep learning-based denoising network or model) in the complex domain (with both real and imaginary data) followed by super-resolution to overcome (e.g., remove) any blur present in the denoised complex image that might be introduced by the denoising model to render a higher resolution complex image (e.g., rendering sharp vessels). Technical effects of the disclosed subject matter also include increasing the quality of the image by improving the SNR. Technical effects of the disclosed subject matter further include reducing the artifacts imparted by the noise in phase. Technical effects of the disclosed subject matter even further include rendering vessels sharp.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

This written description uses examples to disclose the present subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for improving image quality of susceptibility weighted imaging (SWI), comprising:

acquiring, via a processor, a magnetic resonance imaging (MRI) complex signal having a plurality of complex echoes of a region of interest via an MRI scanner from a coil during an SWI sequence;

phase filtering, via the processor, each complex echo of the plurality of complex echoes;

generating, via the processor, a respective phase image and a respective magnitude image from each phase filtered complex echo, wherein the respective phase image is generated only from imaginary channel data and the respective magnitude image is generated only from real channel data from each phase filtered complex echo;

combining, via the processor, separately the respective magnitude images of the plurality of complex echoes with each other to generate a combined magnitude image and the respective phase images of the plurality of complex echoes with each other to generate a combined phase image;

generating, via the processor, a complex image from both the combined magnitude image and the combined phase image; and utilizing, via the processor, a deep learning-based denoising network to denoise the complex image to generate a denoised complex image.

2. The computer-implemented method of claim 1, further comprising applying, via the processor, super-resolution to the denoised complex image to generate a higher resolution denoised complex image that has had any blur removed.

3. The computer-implemented method of claim 2, further comprising generating, via the processor, a phase image from the higher resolution denoised complex image utilizing phase filtering.

4. The computer-implemented method of claim 3, further comprising generating, via the processor, a phase mask based solely on the phase image.

5. The computer-implemented method of claim 4, further comprising generating, via the processor, a SWI processed image of the region of interest based on the phase mask and the respective magnitude image for each complex echo of the plurality of complex echoes.

6. The computer-implemented method of claim 3, further comprising generating, via the processor, a magnitude image from the higher resolution denoised complex image, wherein the magnitude image is partially denoised.

7. The computer-implemented method of claim 6, further comprising generating, via the processor, a phase mask based on phase image and the magnitude image with a percent residue of the combined magnitude image added.

8. The computer-implemented method of claim 7, further comprising generating, via the processor, a SWI processed image of the region of interest based on the phase mask and the magnitude image with the percent residue of the combined magnitude image added.

9. The computer-implemented method of claim 1, wherein combining the respective magnitude images of the plurality of complex echoes with each other comprises combining the respective magnitude images with each other utilizing root mean square to generate the combined magnitude image.

10. The computer-implemented method of claim 1, wherein combining the respective phase images of the plurality of complex echoes with each other comprises combining the respective phase images with each other utilizing averaging to generate the combined phase image.

11. A system for improving image quality of susceptibility weighted imaging (SWI), comprising:

a memory encoding processor-executable routines; and a processor configured to access the memory and to execute the processor-executable routines, wherein the routines, when executed by the processor, cause the processor to:

acquire a magnetic resonance imaging (MRI) complex signal having a plurality of complex echoes of a region of interest via an MRI scanner from a coil during an SWI sequence;

phase filter each complex echo of the plurality of complex echoes;

generate a respective phase image and a respective magnitude image from each phase filtered complex echo, wherein the respective phase image is generated only from imaginary channel data and the respective magnitude image is generated only from real channel data from each phase filtered complex echo;

combine separately the respective magnitude images of the plurality of complex echoes with each other to generate a combined magnitude image and the respective phase images of the plurality of complex echoes with each other to generate a combined phase image;

generate a complex image from both the combined magnitude image and the combined phase image; and utilize a deep learning-based denoising network to denoise the complex image to generate a denoised complex image.

12. The system of claim 11, wherein the routines, when executed by the processor, cause the processor to apply super-resolution to the denoised complex image to generate a higher resolution denoised complex image that has had any blur removed.

13. The system of claim 12, wherein the routines, when executed by the processor, cause the processor to generate a phase image from the higher resolution denoised complex image.

14. The system of claim 13, wherein the routines, when executed by the processor, cause the processor to generate a phase mask based solely on the phase image.

15. The system of claim 14, wherein the routines, when executed by the processor, cause the processor to generate a SWI processed image of the region of interest based on the phase mask and the respective magnitude image for each complex echo of the plurality of complex echoes.

16. The system of claim 13, wherein the routines, when executed by the processor, cause the processor to generate a magnitude image from the higher resolution denoised complex image, wherein the magnitude image is partially denoised.

17. The system of claim 16, wherein the routines, when executed by the processor, cause the processor to generate a phase mask based on phase image and the magnitude image with a percent residue of the combined magnitude image added.

18. The system of claim 17, wherein the routines, when executed by the processor, cause the processor to generate a SWI processed image of the region of interest based on the phase mask and the magnitude image with the percent residue of the combined magnitude image added.

19. The system of claim 11, wherein combining the respective magnitude images of the plurality of complex echoes with each other comprises combining the respective magnitude images with each other utilizing root mean square to generate the combined magnitude image, and wherein combining the respective phase images of the plurality of complex echoes with each other comprises combining the respective phase images with each other utilizing averaging to generate the combined phase image.

20. A non-transitory computer-readable medium, the computer-readable medium comprising processor-executable code that when executed by a processor, causes the processor to:

acquire a magnetic resonance imaging (MRI) complex signal having a plurality of echoes of a region of interest via an MRI scanner from a coil during a multi-echo acquisition imaging sequence;

phase filter each complex echo of the plurality of complex echoes;

generate a respective phase image and a respective magnitude image from each phase filtered complex echo, wherein the respective phase image is generated only from imaginary channel data and the respective magnitude image is generated only from real channel data from each phase filtered complex echo;

combine separately the respective magnitude images of the plurality of complex echoes with each other to generate a combined magnitude image and the respective phase images of the plurality of complex echoes with each other to generate a combined phase image;

generate a complex image from both the combined magnitude image and the combined phase image;

utilize a deep learning-based denoising network to denoise the complex image to generate a denoised complex image; and apply super-resolution to the denoised complex image to generate a higher resolution denoised complex image that has had any blur removed.

* * * * *